(12) United States Patent
Yano et al.

(10) Patent No.: US 8,728,272 B2
(45) Date of Patent: May 20, 2014

(54) MICROFIBRILLATED CELLULOSE HAVING CELLULOSE TYPE-II CRYSTALLINE STRUCTURE, AND MOLDED ARTICLE CONTAINING THE MICROFIBRILLATED CELLULOSE

(75) Inventors: Hiroyuki Yano, Uji (JP); Antonio Norio Nakagaito, Uji (JP)

(73) Assignee: Kyoto University, Kyoto-shi (JP)

( * ) Notice: Subject to any disclaimer, the term of this patent is extended or adjusted under 35 U.S.C. 154(b) by 1138 days.

(21) Appl. No.: 12/309,416

(22) PCT Filed: Jul. 13, 2007

(86) PCT No.: PCT/JP2007/064005
§ 371 (c)(1),
(2), (4) Date: Jul. 6, 2009

(87) PCT Pub. No.: WO2008/010464
PCT Pub. Date: Jan. 24, 2008

(65) Prior Publication Data
US 2009/0308552 A1    Dec. 17, 2009

(30) Foreign Application Priority Data
Jul. 19, 2006    (JP) .................. 2006-197513

(51) Int. Cl.
*D21H 17/52*    (2006.01)
*D21H 17/33*    (2006.01)

(52) U.S. Cl.
USPC ...... 162/157.6; 162/9; 162/157.1; 162/164.3; 162/218

(58) Field of Classification Search
USPC ............ 162/9, 157.1, 164.3, 164.1, 218, 231, 162/157.6
See application file for complete search history.

(56) References Cited

U.S. PATENT DOCUMENTS 5,964,983 A * 10/1999 Dinand et al. ............... 162/27
6,083,582 A *  7/2000 Chen et al. ............... 428/34.8
(Continued)

FOREIGN PATENT DOCUMENTS

EP    1036799 A1    9/2000
JP    09-124702     5/1997
(Continued)

OTHER PUBLICATIONS

Sun, C. "True Density of Microcrystalline Cellulose" Journal or Pharmaceutical Sciences, v. 94, No. 10, 2005, pp. 2132-2134 [online] [retrieved from the Internet [retrieved Nov. 24, 2011] <URL: http://onlinelibrary.wiley.com/doi/10.1002/jps.20459/pdf>.*

(Continued)

*Primary Examiner* — Dennis Cordray
(74) *Attorney, Agent, or Firm* — Edwards Wildman Palmer LLP; James E. Armstrong, IV

(57) ABSTRACT

Although a microfibrillated cellulose has been conventionally added to a resin molded article for the purpose of improving the properties of resin such as strength, it is only possible to achieve the same level of strength as that of the resin itself. The object is to provide a resin molded article of greater strength. A molded article can be produced by blending resin with a microfibrillated cellulose having a type-II crystalline structure produced by treating a microfibrillated cellulose with an alkali solution. The molded article can be largely increased in tensile strength or flexural strength, tensile strain at break or flexural strain at break, and fracture toughness (work-of-fracture) compared to a molded article produced with resin containing a conventional microfibrillated cellulose.

4 Claims, 3 Drawing Sheets

(56) References Cited

U.S. PATENT DOCUMENTS

| | | | |
|---|---|---|---|
| 6,103,790 | A | 8/2000 | Cavaille et al. |
| 6,541,627 | B1 | 4/2003 | Ono et al. |
| 6,821,531 | B2* | 11/2004 | Kumar .......................... 424/488 |
| 7,108,907 | B1 | 9/2006 | Yamane et al. |
| 2002/0061335 | A1 | 5/2002 | Kumar |
| 2005/0067730 | A1* | 3/2005 | Yano et al. .................... 264/109 |
| 2006/0182941 | A1* | 8/2006 | Yano et al. ................. 428/292.1 |
| 2009/0054552 | A1* | 2/2009 | Yano et al. .................... 523/200 |

FOREIGN PATENT DOCUMENTS

| | | |
|---|---|---|
| JP | 09-509694 | 9/1997 |
| JP | 10-251301 | 9/1998 |
| JP | 2005-042283 | 2/2005 |
| JP | 2005-068140 | 3/2005 |
| WO | WO-93/10172 A1 | 5/1993 |
| WO | WO-99/28350 | 6/1999 |
| WO | WO-01/34655 | 5/2001 |

OTHER PUBLICATIONS

"DOW® Epoxy Resins" Technical data sheet, The Dow Chemical Company, pp. 1-49 [online] [retrieved from the Internet [retrieved Nov. 24, 2011] <URL: http://msdssearch.dow.com/PublishedLiteratureDOWCOM/dh_004e/0901b8038004e7b6.pdf?filepath=epoxy/pdfs/noreg/296-00312.pdf&fromPage=GetDoc>.*

International Search Report mailed Aug. 28, 2007, issued on PCT/JP2007/064005.

William J. Orts et al., "Application of Cellulose Microfibrils in Polymer Nanocomposites," Journal of Polymers and the Environment, vol. 13, No. 4, pp. 301-306, 2005.

Supplementary European Search Report dated Apr. 27, 2011, issued for the corresponding European Patent Application No. 07790785.5.

* cited by examiner

MICROFIBRILLATED CELLULOSE HAVING CELLULOSE TYPE-II CRYSTALLINE STRUCTURE, AND MOLDED ARTICLE CONTAINING THE MICROFIBRILLATED CELLULOSE

TECHNICAL FIELD

The present invention relates to a microfibrillated cellulose having a cellulose type-II crystalline structure, molded articles containing the microfibrillated cellulose, methods for producing such microfibrillated cellulose and molded articles, and methods for enhancing the strength of the microfibrillated cellulose and the molded articles.

BACKGROUND ART

The cell walls of all plant have a basic framework provided by high-strength nanofibers having about 4 nm wide called cellulose microfibrils. When plant fibers such as pulp are fibrillated to the level of cellulose microfibrils, microfibrillated cellulose is obtained that forms nanofibers having an extended-chain crystalline structure. Some types of known microfibrillated cellulose originate in bacteria (mainly acetic acid bacteria). Nata de coco is one well-known example of food using such microfibrillated cellulose. Because microfibrillated cellulose is known to possess desirable properties such as strength and lightness of weight, attempts have been made to improve the strength and other properties of resin by blending it with microfibrillated cellulose (for example, see Patent Document 1).

In one method, resin, such as phenolic resin, is added to microfibrillated cellulose. However, this lowers the fracture strain, and makes the product fragile. In some cases, it even lowers the strength of the resin. Accordingly, there is a need to find ways to improve properties such as strength and fracture strain.

Meanwhile, cellulose is classified into types I, II, III, and IV, according to its crystalline structure. Type-I cellulose includes naturally occurring celluloses (for example, cotton), and microfibrillated cellulose. Type-I cellulose is known to change its crystalline structure and becomes type-II cellulose when immersed in a sodium hydroxide aqueous solution.

Patent Document 1: JP-T-9-509694

DISCLOSURE OF THE INVENTION

Technical Problem

Figure 1:
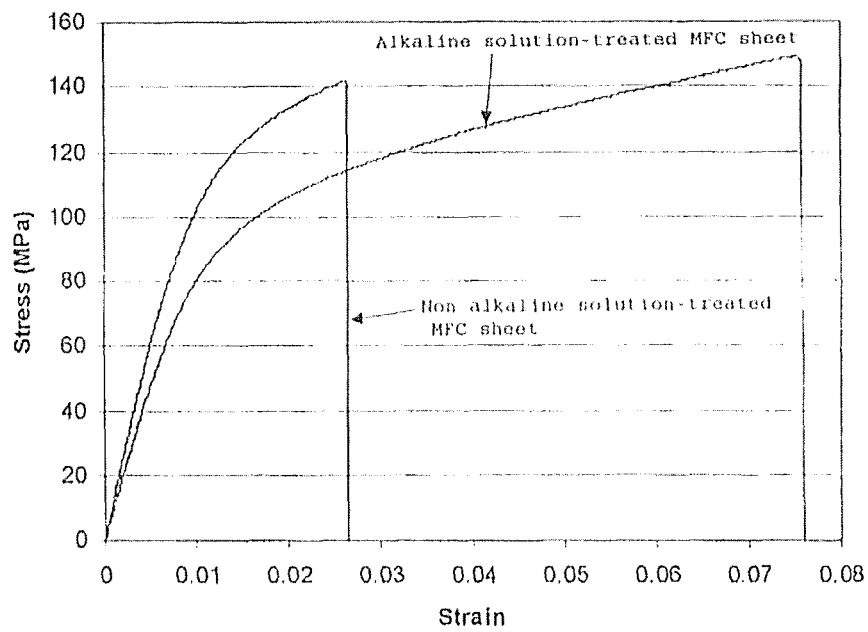
FIG. 1 shows graphs representing the results of a tensile strength test according to the Test Example, in which the upper graph shows the result for MFC samples, and the lower graph shows the result for pulp samples; the vertical axis, the stress (MPa); the horizontal axis, and the strain.
Figure 1:
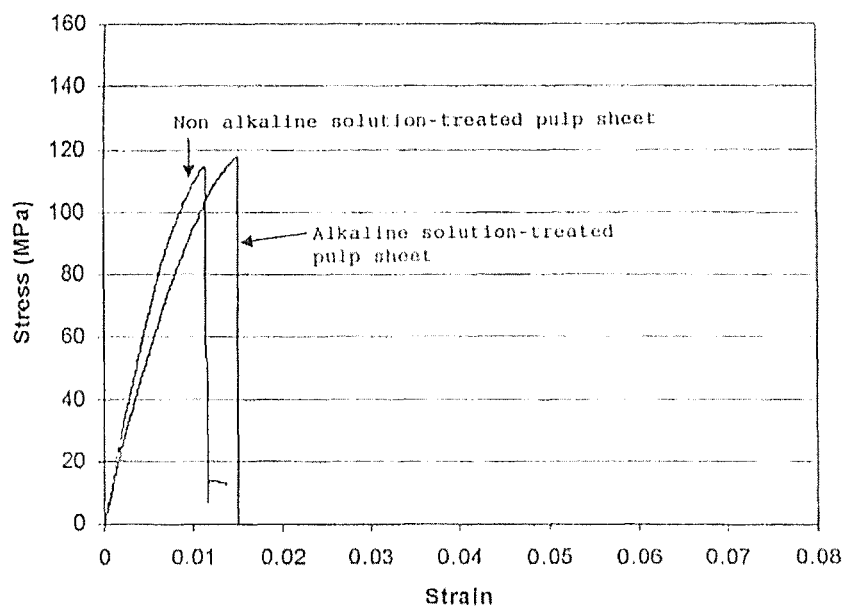

An object of the present invention is to provide a microfibrillated cellulose and molded articles containing microfibrillated cellulose, having enhanced strength such as tensile strength, flexural strength, fracture strain, and fracture toughness (work of fracture).

Technical Solution

The inventors of the present invention completed the present invention based on the finding that microfibrillated cellulose, when treated with an alkaline solution by being immersed therein, changes its crystalline structure to type II, and that a sheet-like article prepared from such microfibrillated cellulose having a type-II crystalline structure possesses enhanced tensile strength, tensile fracture strain, and fracture toughness (work of fracture) far greater than that seen in molded articles containing other types of cellulose fibers. The fact that the mechanical properties of the molded articles were improved by blending with the alkaline solution-treated microfibrillated cellulose suggests that the mechanical properties of the alkaline solution-treated microfibrillated cellulose itself were improved, along with those of the molded articles.

Specifically, the present invention relates to microfibrillated cellulose, molded articles containing the microfibrillated cellulose, methods for producing the microfibrillated cellulose and the molded articles, and methods for enhancing the strength of the microfibrillated cellulose and the molded articles, as follows.

Item 1: A microfibrillated cellulose having a cellulose type-II crystalline structure.

Item 2: A molded article, which comprises 1 to 100 weight % of the microfibrillated cellulose of Item 1, and 0 to 99 weight % of resin.

Item 3: A method for producing the microfibrillated cellulose of Item 1, the method comprising subjecting microfibrillated cellulose to an alkaline solution treatment.

Item 4: A method according to Item 3, wherein the alkaline solution treatment is conducted by immersing the microfibrillated cellulose in an alkaline aqueous solution.

Item 5: A method for producing the microfibrillated cellulose of Item 1 from a material that contains plant cellulose fibers, the method comprising subjecting the material to an alkaline solution treatment.

Item 6: A method according to Item 5, wherein the alkaline solution treatment is conducted by immersing the material in an alkaline aqueous solution.

Item 7: A method for producing the molded article of Item 2, comprising:
blending 1 to 100 weight % of the microfibrillated cellulose of Item 1, and 0 to 99 weight % of resin; and
molding the mixture.

Item 8: A method for enhancing the strength of microfibrillated cellulose, the method comprising subjecting microfibrillated cellulose to an alkaline solution treatment.

Item 9: A method according to Item 8, wherein the alkaline solution treatment is conducted by immersing microfibrillated cellulose in an alkaline aqueous solution.

Item 10: A method for enhancing the strength of a molded article that contains 1 to 100 weight % of microfibrillated cellulose, and 0 to 99 weight % of resin, the method comprising using the microfibrillated cellulose of Item 1 as the microfibrillated cellulose.

The crystalline structure of the microfibrillated cellulose of the present invention is primarily a type-II structure; however, other types of crystalline structures may be partially included. The proportion of the type-II crystalline structure in the microfibrillated cellulose is preferably 10% to 100%, more preferably 30% to 100%, further preferably 50% to 100%, and most preferably 70% to 100%.

As used herein, the type-II crystalline structure is defined as a crystalline structure of a monoclinic crystal system with a crystal unit cell size of a:0.908 (nm), b:0.817 (nm), γ:117.1 (°) as measured by X-ray diffractometry. The type-I crystalline structure is defined as a crystalline structure of a monoclinic crystal system with a crystal unit cell size of a:0.793 (nm), b:0.803 (nm), γ:97.2 (°) as measured by X-ray diffractometry. Aside from X-ray diffractometry, the crystalline structure of the microfibrillated cellulose can also be confirmed by methods such as Raman analysis and solid-state NMR analysis.

The average fiber diameter of the microfibrillated cellulose of the present invention is preferably 4 nm to 400 nm, more preferably 4 nm to 200 nm, and further preferably 4 nm to 100 nm. The average fiber length is preferably 50 nm to 50 μm, and more preferably 100 nm to 10 μm.

The molded article of the present invention includes 1 to 100 weight % of the microfibrillated cellulose having type-II crystalline structure, and 0 to 99 weight % of resin. It is known that common microfibrillated celluloses are moldable without using resin. Likewise, the microfibrillated cellulose having type-II crystalline structure of the present invention (hereinafter also referred to as "type-II microfibrillated cellulose") is moldable into articles without using resin. However, the use of resin in forming molded articles is possible where required, because it generally makes the molding process easier, and enables the properties of the molded articles to be altered. The content of the type-II microfibrillated cellulose in the molded article is 1 to 100 weight %, preferably 3 to 100 weight %, more preferably 5 to 100 weight %, and further preferably 10 to 100 weight %.

The resin content in the molded article is 0 to 99 weight %, preferably 0 to 98 weight %, more preferably 0 to 97 weight %, and further preferably 0 to 95 weight %.

The resin is not particularly limited, and the following resins may be used. Thermoplastic resins such as polylactic acid, vinyl chloride resin, vinyl acetate resin, polystyrene, ABS resin, acrylic resin, polyethylene, polyethylene terephthalate, polypropylene, fluorine-contained resin, polyamide, acetal resin, polycarbonate, cellulose plastic, polyesters such as polyglycolic acid, poly-3-hydroxybutyrate, poly-4-hydroxybutyrate, polyhydroxyvalerate polyethylene adipate, polycaprolactone, polypropiolactone, polyethers such as polyethylene glycol, polyamides such as polyglutamic acid and polylysine, polyvinyl alcohol and polyurethane; and thermosetting resins such as phenolic resin, urea resin, melamine resin, unsaturated polyester, epoxy resin, diallyl phthalate resin, polyurethane, silicone resin, and polyimide. These are non-limiting examples, and the resin can be used either individually or in a combination of two or more. Among these examples, biodegradable resins (such as polylactic acid), phenolic resin, and epoxy resin are preferable.

Examples of the biodegradable resins include homopolymers, copolymers, and polymer mixtures of compounds such as L-lactic acid, D-lactic acid, DL-lactic acid, glycolic acid, malic acid, ε-caprolactone, N-methylpyrrolidone, trimethylene carbonate, p-dioxanone, 1,5-dioxepan-2-one, hydroxybutyrate, and hydroxyvalerate. These may be used either individually or in a combination of two or more. Among these biodegradable resins, polylactic acid and polycaprolactone are preferable, and polylactic acid is more preferable.

In addition to the type-II microfibrillated cellulose and resin, the molded article of the present invention may include other components. Non-limiting examples of such additional components include: polysaccharides such as starch and alginic acid; natural proteins such as gelatin, hide glue, and casein; inorganic compounds such as ceramics and metal powder; colorants; fragrances; pigments; fluidity adjusters; leveling agents; conducting agents; antistatic agents; ultraviolet absorbers; ultraviolet dispersants; dispersants; and deodorants.

The molded article of the present invention excels in tensile strength or flexural strength, tensile fracture strain or flexural fracture strain, and fracture toughness. For example, in the test example below, the tensile fracture strain of the molded article using type-II microfibrillated cellulose was about three times greater than that of the molded article using type-I, rather than type-II, microfibrillated cellulose.

The type-II microfibrillated cellulose of the present invention can be produced by an alkaline solution treatment of microfibrillated cellulose. Alternatively, the type-II microfibrillated cellulose of the present invention can be produced by introducing a type-II crystalline structure to a cellulose material by an alkaline solution treatment of a material containing plant cellulose fibers, and breaking up the cellulose material using a known microfibrillated cellulose production method. For convenience, these two microfibrillated cellulose production methods are herein also referred to as Production Method 1 and Production Method 2, respectively.

In microfibrillated cellulose Production Method 1, the microfibrillated cellulose used for treatment is produced by known methods. Generally, the microfibrillated cellulose is produced by fibrillating or breaking up a cellulose material by milling or beating, using devices such as a refiner, a high-pressure homogenizer, an agitated media mill, a stone mill, or a grinder. However, other known methods, such as in, for example, JP-A-2005-42283, may also be used. Further, the microfibrillated cellulose may be produced with the use of microorganisms, such as, for example, acetic acid bacteria (Acetobacter). Use of commercially available products is also possible. The cellulose used in the present invention may be of any known origin, such as plant (for example, wood, bamboo, hemp, jute, kenaf, agricultural residues, fabric, pulp, recycled pulp, and used paper), animal (for example, ascidians), algae, or microorganism (for example, acetic acid bacteria (Acetobacter)). In the present invention, every celluloses described above can be used. Cellulose fibers of plant- and microorgahism-origin are preferable, and cellulose fibers of plant-origin are more preferable.

The average fiber diameter of the microfibrillated cellulose used for treatment is preferably 4 nm to 400 nm, more preferably 4 nm to 200 nm, and further preferably 4 nm to 100 nm. The average fiber length is preferably 50 nm to 50 μm, and more preferably 100 nm to 10 ∞m.

In microfibrillated cellulose Production Method 1, the alkaline solution treatment of the microfibrillated cellulose is performed by making the microfibrillated cellulose (subject) contact an alkaline solution. The contact method is not particularly limited. For example, the subject may be immersed in an alkaline solution; an alkaline solution may be sprayed over the subject; an alkaline solution may be dropped on the subject; or an alkaline solution may be flown over the subject. Preferably, the alkaline solution treatment is performed by immersing the subject in an alkaline solution.

As the alkaline solution used in the alkaline solution treatment, an alkali hydroxide aqueous solution, ammonia water and the like, can be used. An alkali hydroxide aqueous solution and ammonia water are preferable. A sodium hydroxide aqueous solution and ammonia water are more preferable. A sodium hydroxide aqueous solution is further preferable. The concentration of the alkaline solution is not particularly limited, and is generally 5 to 40 weight %, preferably 5 to 30 weight %, more preferably 10 to 25 weight %, and further preferably 15 to 25 weight %.

The temperature of the alkaline solution treatment is generally 0 to 150° C., preferably 15 to 100° C., and more preferably 15 to 60° C. The duration of the alkaline solution treatment is generally 1 second to 24 hours, preferably 1 minute to 18 hours, and more preferably 1 to 16 hours. The alkaline solution treatment may be performed under applied pressure.

The alkaline solution treatment may be followed by optional procedures such as washing (for example, with water) or drying, to obtain a microfibrillated cellulose having a cellulose type-II crystalline structure.

In microfibrillated cellulose Production Method 2 of the present invention, a cellulose material is fibrillated or broken up using a known production method of microfibrillated cellulose, after introducing a type-II crystalline structure to the cellulose material by an alkaline solution treatment of a material containing plant cellulose fibers. Examples of the plant cellulose fiber-containing material include wood, bamboo, hemp, jute, kenaf, farm residues, fabric, pulp, recycled pulp, and used paper. The material is not limited to these, and any plant cellulose fiber-containing materials can be used that are used for the production of microfibrillated cellulose. Further, with a device such as a refiner, these materials may be processed into a shape (such as, for example, a powder, a fiber, or a sheet) that improves the efficiency of the alkaline solution treatment, as required. When the material contains cell-wall matrix components such as lignin, the material is first conditioned, for example, by removing the matrix components either partially or entirely to allow the cellulose crystal to sufficiently swell in alkali, before the material is subjected to the alkaline solution treatment described in Production Method 1.

After the alkaline solution treatment, the material is processed into the microfibrillated cellulose of the present invention by known fibrillating or breaking techniques used in the production of microfibrillated cellulose, generally by milling or beating using devices such as a high-pressure homogenizer, an agitated media mill, a stone mill, and a grinder. Use of special types of other known methods, such as in, for example, JP-A-2005-42283, is also possible.

The molded article production method of the present invention is characterized by using the microfibrillated cellulose of the present invention as the microfibrillated cellulose in the production method of the molded article, which is produced by molding microfibrillated cellulose either alone or optionally with 0 to 99 weight % of resin. Molding may be performed by common molding methods of microfibrillated cellulose, or common molding methods of microfibrillated cellulose-containing resin.

The microfibrillated cellulose strength-enhancing method of the present invention is a method that uses an alkaline solution treatment to enhance the tensile strength or flexural strength, the tensile fracture strain or flexural fracture strain, and the fracture toughness (work of fracture) of the microfibrillated cellulose. As described above, the tensile strength, tensile fracture strain, and fracture toughness of a sheet prepared from the microfibrillated cellulose having a type-II crystalline structure are considerably enhanced over the properties of common microfibrillated celluloses. This suggests that the mechanical properties of the alkaline solution-treated microfibrillated cellulose itself are improved, along with those of the molded articles. The alkaline solution treatment in the strength-enhancing method of the present invention may be essentially the same as the alkaline solution treatment in the production method of the microfibrillated cellulose of the present invention. That is, the alkaline solution treatment in the strength-enhancing method of the present invention may be performed under essentially the same conditions as in the alkaline solution treatment in Production Method 1 of the present invention.

The molded article strength-enhancing method of the present invention, as in the molded article production method of the present invention, is characterized by using the microfibrillated cellulose of the present invention as the microfibrillated cellulose in the production method in which microfibrillated cellulose is molded either alone or optionally with 0 to 99 weight % of resin. Molding may be performed by common microfibrillated cellulose molding methods, or common microfibrillated cellulose-containing resin molding methods. The molded article strength-enhancing method of the present invention enhances the tensile strength or flexural strength, the tensile fracture strain or flexural fracture strain, and the fracture toughness of the molded article, compared with molded articles obtained from common microfibrillated celluloses. The extent of enhancement of the present invention was particularly large for fracture strain and fracture toughness, compared to the case where the alkali treatment conducted to the pulp contained in the molded articles, as described in the test example below.

The microfibrillated cellulose of the present invention, and the microfibrillated cellulose obtained by the production method or strength-enhancing method of the present invention, are highly useful as material of molded articles. This is because molded articles of the microfibrillated cellulose of the present invention, and resin molded articles containing the microfibrillated cellulose, have much better strength properties than common microfibrillated cellulose molded articles and common microfibrillated cellulose-containing resin molded articles. The present invention is therefore useful not only in applications where traditional microfibrillated cellulose molded articles and traditional microfibrillated cellulose-containing resin molded articles are used, but also in applications requiring more impact-resistance than that possible with traditional microfibrillated cellulose molded articles and traditional microfibrillated cellulose-containing resin molded articles. For example, the invention is applicable to the interior materials, exterior materials, and structural materials of transporters such as automobiles, trains, ships, and airplanes; the housings, structural materials, and internal parts of electrical appliances such as personal computers, televisions, telephones, and watches; the housings, structural materials, and internal parts of mobile communication equipment such as cell phones; the housings, structural materials, and internal parts of devices such as portable music players, video players, printers, copiers, and sporting equipment; building materials; and office supplies such as stationery.

Effects of the Invention

The present invention provides a microfibrillated cellulose and molded articles containing the microfibrillated cellulose, having considerably enhanced strength including tensile strength, flexural strength, tensile fracture strain, flexural fracture strain, and fracture toughness.

BEST MODE FOR CARRYING OUT THE INVENTION

The present invention is described below in greater detail, using examples. The present invention, however, is not limited by these examples.

EXAMPLES

Test Example

Sheets were prepared by molding a microfibrillated cellulose (also referred to as "MFC" hereinafter), an alkaline solution-treated microfibrillated cellulose, a pulp, and an alkaline solution-treated pulp. The sheets were mixed with phenolic resin, and their properties were determined by a tensile strength test, a flexural strength test, and X-ray diffractometry. The results are shown in FIG. 1 (tensile strength test), FIG. 2 (flexural strength test), and FIG. 3 (X-ray diffractometry).

<Samples>

MFC: "Celish" (KY100G, Daicel Chemical Industries, Ltd.)

Pulp: NBKP (needle bleached kraft pulp, Daishowa Seishi)

Phenolic resin: resol type (PL2340; number average molecular weight, 3,300; Gunei Chemical Industry Co., Ltd.)

<Preparation of Sheets>

A pulp aqueous suspension (solids content: 0.2 weight %) was thoroughly stirred, and filtered by suction filtration to form a sheet on a filter. After removing the filter paper, the sheet (about 0.2 mm thick) was dehydrated until the water content was about 40%. This was followed by drying at 70° C. for 24 hours. In the same manner, a sheet was prepared from a MFC aqueous suspension (solid content: 0.2 weight %).

<Alkaline Solution Treatment>

The MFC sheet and the pulp sheet were immersed in a 20% sodium hydroxide aqueous solution at ordinary temperature. After 12 hours, the sheets were washed with running water to remove the alkali. No alkali treatment was performed for control sheets.

<Sample Preparation for Tensile Test>

Four kinds of sheets (non alkaline solution-treated MFC sheet, alkaline solution-treated MFC sheet, non alkaline solution-treated pulp sheet, and alkaline solution-treated pulp sheet) were molded to prepare samples for a tensile test.

The MFC sheets were overlaid in four layers, and immersed in a methanol solution (20° C.) containing 10 weight % phenolic resin. For the pulp sheets, a 5% methanol solution of phenolic resin was used to achieve the same phenolic resin content in all molded articles. After removing the methanol, the sample was hot-pressed in a mold at 160° C. for 30 minutes, under a pressure of 100 MPa. The resulting molded article measured 50 mm×40 mm×0.3 mm in size, and had a density of 1.42 g/cm$^3$. The phenolic resin contents in the non-alkaline-solution-treated MFC molded article, the alkaline solution-treated MFC molded article, the non-alkaline-solution-treated pulp molded article, and the alkaline solution-treated pulp molded article were 19.3 weight %, 18.5 weight %, 18.9 weight %, and 16.0 weight %, respectively.

<Sample Preparation for Flexure Test>

Four kinds of sheets (non-alkaline solution-treated MFC sheet, alkaline solution-treated MFC sheet, non-alkaline-solution-treated pulp sheet, and alkaline solution-treated pulp sheet) were molded to prepare samples for a flexure test.

The MFC sheets were overlaid in fifteen layers, and immersed in a methanol solution (20° C.) containing 10 weight % phenolic resin. For the pulp sheets, a 5% methanol solution of phenolic resin was used to achieve the same phenolic resin content in all molded articles. After removing methanol, the sample was hot-pressed in a mold at 160° C. for 30 minutes, under a pressure of 100 MPa. The resulting molded article measured 50 mm×40 mm×1 mm in size, and had a density of 1.42 g/cm$^3$. The phenolic resin contents in the non-alkaline-solution-treated MFC molded article, the alkaline solution-treated MFC molded article, the non-alkaline-solution-treated pulp molded article, and the alkaline solution-treated pulp molded article were 13.6 weight %, 18.5 weight %, 18.9 weight %, and 19.3 weight %, respectively.

<Tensile Strength Test>

The tensile test sample was cut to a size of 30 mm×4 mm×0.3 mm. The sample was held with a chuck at the both ends of its longitudinal direction (chuck distance: 20 mm), and stretched at a deformation rate of 1 mm/min. The result is shown in FIG. 1.

<Flexural Strength Test>

Figure 2:
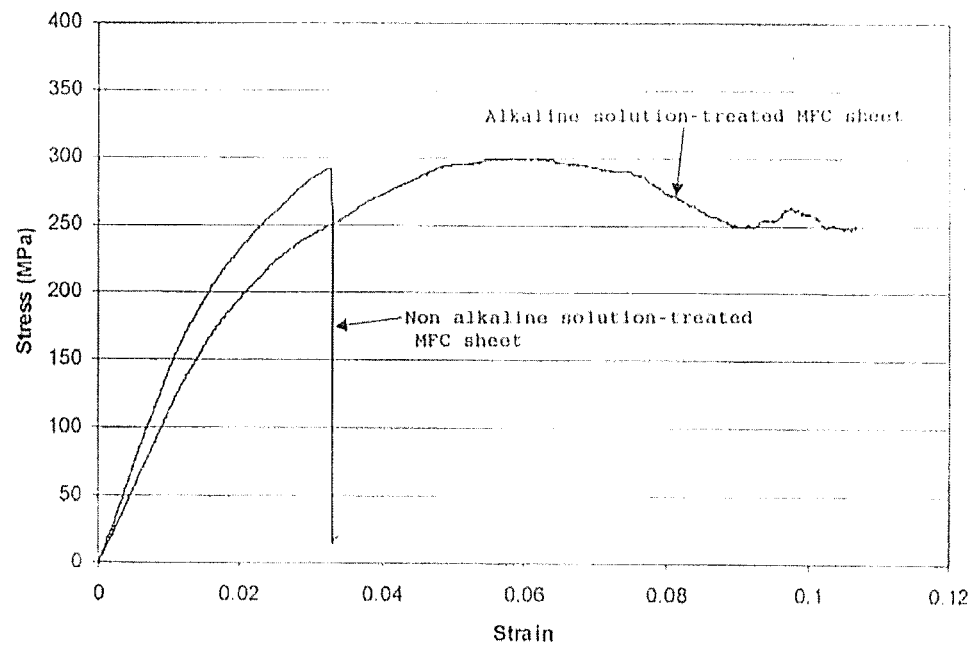
FIG. 2 shows graphs representing the results of a flexural strength test according to the Test Example, in which the upper graph shows the result for MFC samples, and the lower graph shows the result for pulp samples; the vertical axis, the stress (MPa); the horizontal axis, and the strain.
Figure 2:
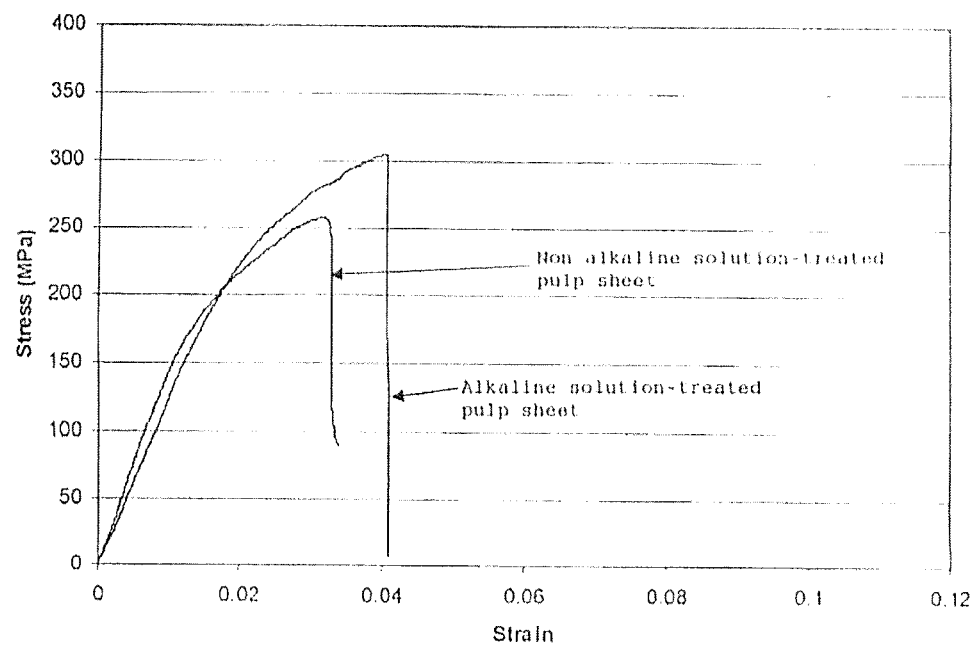

The flexural strength test sample was cut to a size of 40 mm×7 mm×1 mm. The sample was supported at the both ends of its longitudinal direction (two points; span: 30 mm), and a concentrated load was applied at the center at a deformation rate of 5 mm/min (three-point center concentrated load method). The results are shown in FIG. 2.

<X-Ray Diffractometry>

A non-alkaline-solution-treated MFC sheet and an alkaline solution-treated MFC sheet (25 mm×25 mm; thickness: 0.1 mm) were prepared as above, and the samples were analyzed by X-ray diffractometry. The results are shown in FIG. 3.

In the tensile strength test (FIG. 1), the MFC treated with the 20% alkaline solution (NaOH aqueous solution; 12-hour immersion) showed about a 3-fold increase in fracture strain, from about 0.025 (non-alkaline-solution-treated MFC) to about 0.075 (alkaline solution-treated MFC), as represented by the upper graph in FIG. 1. The alkali treatment also improved fracture strain in pulp; however, the increase was only from about 0.01 (non-alkaline-solution-treated pulp) to about 0.014 (alkaline solution-treated pulp), as represented by the lower graph in FIG. 1. These results showed that the enhancement of the tensile fracture strain (fracture toughness, or work of fracture) of the cellulose fiber-containing molded articles by the alkali treatment is far more effective in MFC than in pulp.

In the flexural strength test (FIG. 2), the alkali treatment improved the flexural fracture strain of the pulp by a factor of about 1.25 or about 25%, from about 0.032 (non-alkaline-solution-treated pulp) to about 0.04 (alkaline solution-treated pulp), as represented by the lower graph in FIG. 2. In contrast, in MFC, the alkali treatment increased the flexural fracture strain from about 0.032 (non-alkaline-solution-treated MFC) to at least 0.11 (alkaline solution-treated MFC), as represented by the upper graph in FIG. 2. Note that the alkali-treated MFC was not tested fully because it had a large deflection and did not break. The results showed that the enhancement of the flexural fracture strain (fracture toughness, or work of fracture) of the cellulose fiber-containing molded articles by the alkali treatment is far more effective in MFC than in pulp.

Figure 3:
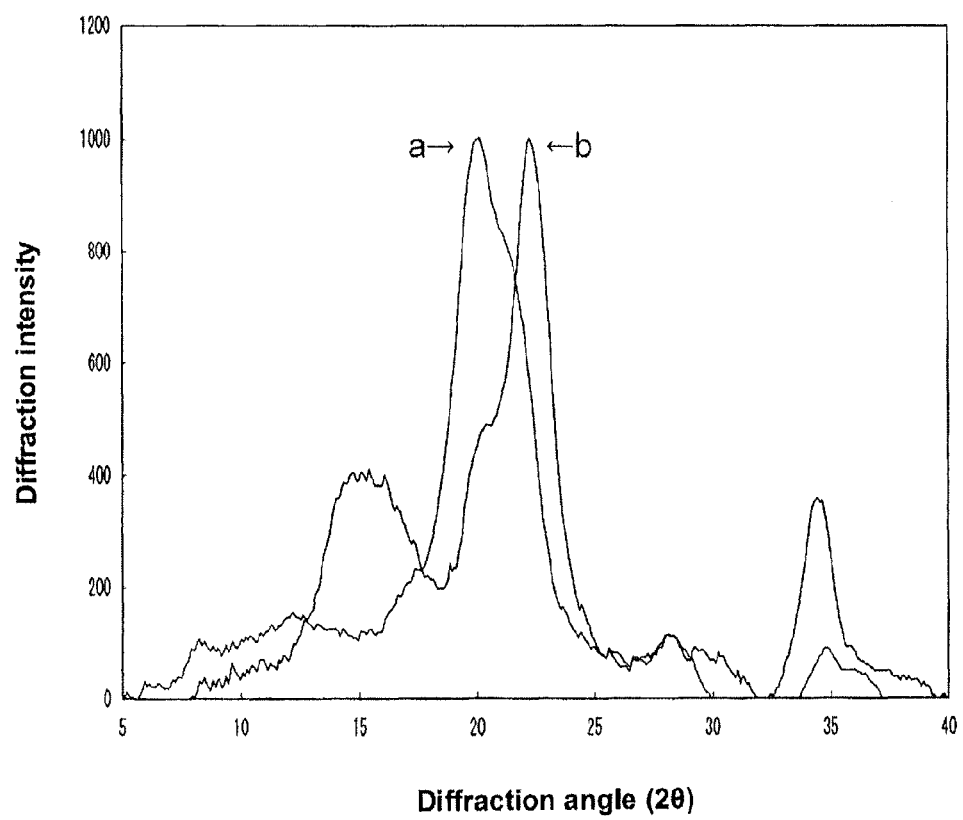
FIG. 3 shows a graph representing the result of X-ray diffraction analysis according to the Test Example, in which a represents a chart for an alkali-treated sample, and b represents a chart for a non-alkali-treated sample; the vertical axis, the strength; the horizontal axis, and the diffraction angle.

In the X-ray diffraction analysis of the MFC sheet (FIG. 3), the characteristic peak of cellulose I observed at a diffraction angle of about 22.5° disappeared (FIG. 3, b). Instead, the characteristic peak of cellulose II was observed at a diffraction angle of about 20° (FIG. 3, a). Clearly, this is the result of the alkali treatment, changing the crystalline morphology of the cellulose from cellulose I to cellulose II. A similar change in crystalline structure was also observed in the pulp sheets.

Industrial Applicability

The present invention is useful not only in applications using traditional microfibrillated celluloses, but also in applications requiring more strength.

The invention claimed is:

1. A method for producing a molded article comprising:
   blending 1 to 81.5 weight % of the microfibrillated cellulose having a cellulose type-II crystalline structure, and 18.5 to 99 weight % of resin; and
   molding the mixture, wherein the microfibrillated cellulose having a cellulose type-II crystalline structure is obtained by subjecting a microfibrillated cellulose obtained from plant cellulose fibers or a material that contains plant cellulose fibers to a 10 to 40 weight % alkaline solution treatment.

2. The method for producing the molded article according to claim 1, wherein the aqueous alkaline solution is a sodium hydroxide aqueous solution or an ammonia water.

3. The method for producing the molded article according to claim 1, wherein the resin is at least one resin selected from the group consisting of biodegradable resin, phenolic resin and epoxy resin.

4. The method for producing the molded article according to claim 2, wherein the resin is at least one resin selected from the group consisting of biodegradable resin, phenolic resin and epoxy resin.

* * * * *